(12) United States Patent
Rapp et al.

(10) Patent No.: US 12,365,249 B2
(45) Date of Patent: Jul. 22, 2025

(54) SYSTEM AND A METHOD FOR PROVIDING ELECTRIC POWER

(71) Applicant: KNORR-BREMSE Systeme fuer Nutzfahrzeuge GmbH, Munich (DE)

(72) Inventors: Tamas Rapp, Budapest (HU); Benedek Pour, Budapest (HU); Kornel Straub, Pomaz (HU); Huba Nemeth, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 631 days.

(21) Appl. No.: 17/277,203

(22) PCT Filed: Sep. 9, 2019

(86) PCT No.: PCT/EP2019/073943
§ 371 (c)(1),
(2) Date: Mar. 17, 2021

(87) PCT Pub. No.: WO2020/058019
PCT Pub. Date: Mar. 26, 2020

(65) Prior Publication Data
US 2022/0024319 A1 Jan. 27, 2022

(30) Foreign Application Priority Data
Sep. 18, 2018 (EP) .................................... 18195138

(51) Int. Cl.
*B60L 3/00* (2019.01)
*B60R 16/02* (2006.01)
*H02J 7/34* (2006.01)

(52) U.S. Cl.
CPC ............ *B60L 3/0092* (2013.01); *B60R 16/02* (2013.01); *H02J 7/34* (2013.01)

(58) Field of Classification Search
CPC .......... B60L 3/0092; B60R 16/02; H02J 7/34
See application file for complete search history.

(56) References Cited

U.S. PATENT DOCUMENTS 5,739,592 A * 4/1998 Rigsby ..................... B60D 1/62
701/32.7
5,768,117 A    6/1998 Takahashi et al.
(Continued)

FOREIGN PATENT DOCUMENTS

CN    101687479 A    3/2010
CN    102753380 A    10/2012
(Continued)

OTHER PUBLICATIONS

"Vehicle." Merriam-Webster.com Dictionary, Merriam-Webster, https://www.merriam-webster.com/dictionary/vehicle. Accessed Mar. 20, 2024. (Year: 2024).*
(Continued)

*Primary Examiner* — Drew A Dunn
*Assistant Examiner* — Pamela J Jeppson
(74) *Attorney, Agent, or Firm* — Crowell & Moring LLP

(57) ABSTRACT

A system for providing power to an unpowered vehicle by a powered vehicle has a line arrangement with multiple lines representing inputs, each of which includes at least one power line for supplying power. A merging unit combines the power lines of the line arrangement to a total voltage on a common voltage line. The line arrangement and the merging unit are to be arranged on the powered vehicle to provide power to the unpowered vehicle.

9 Claims, 1 Drawing Sheet

(56) References Cited

U.S. PATENT DOCUMENTS

| | | |
|---|---|---|
| 6,512,452 B1 | 1/2003 | Brannan et al. |
| 2002/0071292 A1 | 6/2002 | Ihara et al. |
| 2003/0195668 A1* | 10/2003 | Radtke .................. H04B 3/548 701/1 |
| 2004/0178679 A1 | 9/2004 | Kabasawa |
| 2005/0185352 A1* | 8/2005 | Nguyen ................. H02J 9/061 361/90 |
| 2008/0006491 A1* | 1/2008 | Degoul .................... H02J 1/14 188/1.11 E |
| 2010/0141029 A1 | 6/2010 | Heger et al. |
| 2011/0114398 A1* | 5/2011 | Bianco .................... B60K 1/04 320/109 |
| 2011/0191612 A1 | 8/2011 | Itakura et al. |
| 2012/0275799 A1 | 11/2012 | Abraham et al. |
| 2014/0203634 A1* | 7/2014 | Sugiyama ............... B60L 53/22 307/10.1 |
| 2015/0115707 A1 | 4/2015 | Reichow et al. |
| 2015/0197153 A1 | 7/2015 | Luedtke et al. |
| 2015/0217480 A1* | 8/2015 | van der Wel .......... B60L 1/003 366/54 |
| 2018/0229786 A1* | 8/2018 | Weaver .................. B62D 63/08 |
| 2019/0252987 A1 | 8/2019 | Yamano |
| 2019/0308594 A1* | 10/2019 | Fry ....................... B60R 16/023 |

FOREIGN PATENT DOCUMENTS

| | | | | |
|---|---|---|---|---|
| CN | 104786859 A | 7/2015 | | |
| CN | 105102196 A | 11/2015 | | |
| DE | 10 2006 010 713 A1 | 9/2007 | | |
| DE | 10 2007 021 286 A1 | 11/2008 | | |
| JP | 59-175374 A | 10/1984 | | |
| JP | 7-194118 A | 7/1995 | | |
| JP | 2000-197347 A | 7/2000 | | |
| JP | 2004-282850 A | 10/2004 | | |
| JP | 2011160549 A * | 8/2011 | ............... | G06F 1/26 |
| WO | WO 2013/131783 A1 | 9/2013 | | |
| WO | WO-2013180711 A1 * | 12/2013 | ............... | G05B 9/03 |
| WO | WO 2014/058319 A1 | 4/2014 | | |
| WO | WO-2018041387 A1 * | 3/2018 | ............... | B60Q 1/44 |
| WO | WO-2018083813 A1 * | 5/2018 | ............... | H02J 1/102 |

OTHER PUBLICATIONS

Japanese-language Office Action issued in Japanese Application No. 2021-538918 dated Oct. 26, 2022 with English translation (12 pages).
International Search Report (PCT/ISA/210) issued in PCT Application No. PCT/EP2019/073943 dated Sep. 9, 2019 (three (3) pages).
Extended European Search Report issued in European Application No. 18195138.5 dated Nov. 9, 2018 (six (6) pages).
Written Opinion (PCT/ISA/237) issued in PCT Application No. PCT/EP2019/073943 dated Sep. 9, 2019 (five (5) pages).
Chinese-language Office Action issued in Chinese Application No. 201980061116.7 dated Mar. 20, 2023 with English translation (12 pages).
Japanese-language Office Action issued in Japanese Application No. 2021-538918 dated May 9, 2022 with English translation (13 pages).
Korean-language Office Action issued in Korean Application No. 10-2021-7009249 dated Nov. 24, 2022 with English translation (10 pages).

* cited by examiner

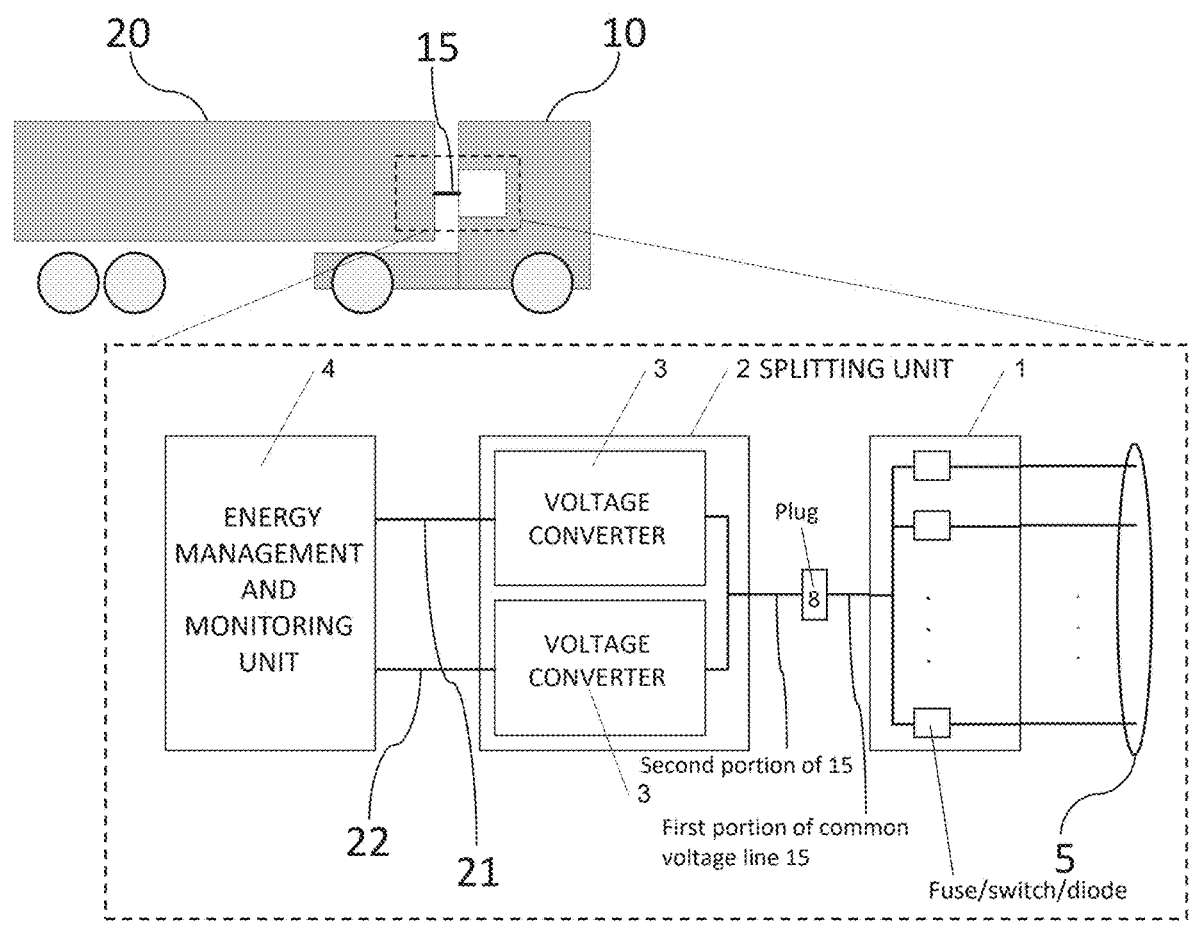

SYSTEM AND A METHOD FOR PROVIDING ELECTRIC POWER

BACKGROUND AND SUMMARY OF THE INVENTION

The present invention relates to a system of providing power to an unpowered vehicle by a powered vehicle and, in particular, to a redundant electric power supply architecture for vehicle combinations (powered and unpowered vehicle).

The conventional control and actuation of brake systems in commercial vehicles and other safety relevant systems are often based on compressed air as the energy source. The energy is thus stored as compressed air in compressed air reservoirs and is generated by compressors. The management and monitoring of such systems is performed by a central control unit such as EAC (electronic air control) or APU (air processing unit).

However, compressed air as an energy source is increasingly being replaced by electronic systems, in particular in electric vehicles. Thus, the complete system architecture and many components are replaced by respective electric or electronic components so that the system does not rely any more on compressed air as the energy source and thus there is a demand to provide the same level of safety for electric powered systems as for compressed air systems.

In particular, autonomous operated vehicles need an architecture that provides redundant power supply for the control and/or actuation of many electric units within the vehicle. In addition, also the monitoring is continuously to be ensured—in particular for safety relevant energy storage units, whose information shall be available on the vehicle communication network at any time.

These demands do not only relate to the vehicles itself, but also vehicle combinations such as a tractor as powered vehicle and a trailer as unpowered vehicle, because not only the powered vehicle, but also the coupled vehicle (e.g. the trailer) include safety relevant controllers and/or actuator units that couple to the powered vehicle and that shall be supplied with redundant power. The safety relevant components include, for example, sensors, dynamic controllers, and other components that need a reliable power supply from the powered vehicle, whether or not the power is supplied by compressed air or by an electric power supply.

Conventional power supplies are disclosed, for example, in DE 10 2006 010 713 A1, wherein a safety relevant load is provided with power by a parallelly arranged primary and secondary system. Another conventional power supply is disclosed in DE 10 2007 021 286 A1, wherein a control unit and a brake actuator are powered through separate supply lines. However, these conventional power supplies are not applicable in a simple way for vehicle combinations, wherein for compatibility reasons the power line between the tractor and trailer shall be maintained.

Therefore, there is a demand for a system providing redundant power supply for vehicle combinations and which can be implemented easily.

At least some of the mentioned problems are overcome by a system or a method according to the independent claims. The dependent claims refer to further advantageous realizations of the subject matter of the independent claims.

The present invention relates to a system for providing power to an unpowered vehicle by a powered vehicle. The system comprises a line arrangement with multiple lines representing inputs, each of which comprising at least one power line for supplying power. The system further comprises a merging unit to combine the power lines of the line arrangement to a total voltage on a common voltage line. The line arrangement and the merging unit are to be arranged on the powered vehicle to provide power to the unpowered vehicle.

In addition, the unpowered vehicle may comprise a splitting unit to split the total voltage on the common voltage line into at least two redundant voltages provided for the energy management and monitoring unit.

The system can provide power to an energy management and monitoring unit which can be any unit (typically computer-aided) that is able to monitor, control, and optimize the performance of the energy storage and its usage. Similarly, the line arrangement shall be understood broadly and includes any possible system that is able to provide power on multiple lines. These lines can be inputs of some circuitry and may also include data lines to transmit information back and forth from the exemplary energy management and monitoring unit (e.g. to and from any of the electronic control unit of the vehicle). The merging of the power lines may result in a common voltage line for the total voltage along which the currents from the multiple voltage lines flows. For example, there is only one current path for all currents from the different voltage sources such as battery cells or vehicle power network.

The common voltage line may be adapted to ensure that a non-zero total voltage is supplied to the splitting unit as long as at least one power line of the line arrangement provides power. Optionally, the common voltage line comprises a first portion on the powered vehicle and a second portion on the unpowered vehicle and the first portion and the second portion are connectable by a plug.

Therefore, the single common voltage line between the merging unit and the splitting unit provides a non-zero total voltage to the splitting unit as long as at least one power line of the line arrangement provides supplying power.

Optionally, the line arrangement comprises at least one fuse or switch to prevent an adverse effect of a possible short on at least one of the multiples lines. The at least one fuse or switch may comprise at least one diode (e.g. a so-called protective diode) for preventing a voltage drop when the short occurs.

Optionally, the splitting unit comprises at least two voltage converters, in particular one or more DC/DC converters, for providing a voltage conversion of the total voltage into the redundant voltages. Optionally, the merging unit and/or the splitting unit are integrated into one or distributed in more units. For example, each of the exemplary DC/DC converter may be formed in separate units that are electrically isolated from one another.

A further embodiment relates to a vehicle (in particular a commercial vehicle) with a system as described before.

Another embodiment relates to a method for providing power to an unpowered vehicle by a powered vehicle. The method comprises the steps of:
- feeding power on a line arrangement with multiple lines representing inputs or outputs into a merging unit;
- merging power on the multiple lines of the line arrangement to a total voltage on a common voltage line; and
- transmitting the total voltage form the powered vehicle to the unpowered vehicle.

The method may optionally include the following steps:
- splitting the total voltage into at least two redundant voltages; and
- providing the at least two redundant voltages for the energy management and monitoring unit.

This method or part thereof may be implemented in software or a computer program product and can be implemented by software or a software module in an ECU (electronic control unit). Therefore, embodiment relate also to a computer program having a program code for performing the method, when the computer program is executed on a processor. Embodiments are also intended to cover program storage devices, e.g., digital data storage media, which are machine or computer readable and encode machine-executable or computer-executable programs of instructions, wherein the instructions perform some or all of the acts of the above-described methods, when executed on the computer or processor.

Some examples of the systems and/or methods will be described in the following by way of examples only, and with respect to the accompanying FIGURE.

BRIEF DESCRIPTION OF THE DRAWING

FIG. 1 depicts a system for providing power to an unpowered vehicle by a powered vehicle according to an embodiment of the present invention.

DETAILED DESCRIPTION OF THE DRAWING

FIG. 1 depicts a system for providing power to a vehicle combination with an unpowered vehicle 20 and a powered vehicle 10. The power may be supplied by the depicted system to an energy management and monitoring unit 4 and is provided by a line arrangement 5 with multiple lines representing inputs, each of which comprising at least one power line for supplying power. These multiple lines 5 provide the power to a merging unit 1, where the power lines are combined to a total (or common) voltage which is fed via a common voltage line 15 to a splitting unit 2. The optional splitting unit 2 may be configured to split the total voltage on the common voltage line 15 into at least two redundant voltages provided for the energy management and monitoring unit 4 on two separate lines 21, 22.

The unpowered vehicle 20 is, for example, a trailer, and the powered vehicle 10 a corresponding tractor. The merging unit 1 is, for example, a common supply line generator unit arranged on the powered vehicle 10 and comprises exemplary protective diodes. The line arrangement 5 may also be arranged on the powered vehicle 10, whereas the splitting unit 2 may be arranged on the unpowered vehicle 20. Hence, the common voltage line 15 may comprise a first portion on the powered vehicle 10 and a second portion on the unpowered vehicle 20, and the first portion and the second portion are connectable by a plug 8 (e.g. when coupling the trailer to the tractor). The common voltage line 15 is adapted to ensure that a non-zero total voltage is supplied to the splitting unit 2 whenever at least one power line of the line arrangement 5 provides power.

Therefore, the depicted embodiment provides a power supply by two redundant voltage lines 21, 22 for the exemplary electric energy management and monitoring system 4 which receive power whenever at least one of the power lines 5 feeds power to the merging unit 1. The common voltage line 15 is only powerless if no power arrives at the merging unit 1—since it combines (e.g. adds up) the power of the different input and/or output lines of the system to provide power for the common voltage line.

These input and/or output lines 5 are, for example, connected to one or more batteries or battery cells or the vehicle network. The invention shall not be limited to a particular architecture for providing power to the line arrangement 5. The merging unit 1 may ensure that the independent input lines are never connected directly to each other so that a possible short within one of the lines would have no adverse effect on the overall architecture. In addition, the lines 5 or the connection to the merging unit 1 may include one or more fuses or switches (not shown in FIG. 1) to prevent an adverse effect of a possible short on at least one of the multiples lines 5. The at least one fuse or switch may comprise at least one protective diode allowing a current flow only in one direction, thereby preventing a voltage drop when the short occurs (e.g. downstream of the merging unit 1).

Optionally, the splitting unit 2 comprises at least two voltage converters (e.g. DC/DC converters) that are adapted to provide a voltage conversion of the total voltage on the common line 15 to the redundant voltages on the voltage lines 21, 22. These redundant voltages may have a same or a different value. Optionally, the merging unit 1 and/or the splitting unit 2 are integrated into one or more units (e.g. within different housings). For example, each of the exemplary DC/DC converters may be formed in separate units that are electrically isolated from one another. Thus, the splitting unit 2 provides at least two isolated power lines 21, 22 to exemplary microcontrollers of the energy management and monitoring units 4.

The at least two isolated power lines 21, 22 may be separated and independent from each other so that a malfunctioning (e.g. an interruption or a short) on one of these lines 21, 22 will not adversely affect the other line. As a result, the exemplary safety relevant management unit 4 will have a power supply through any of the two lines and the control and communication of the energy management and monitoring unit can be ensured with a high degree of reliability.

Advantages of embodiments relate in particular to the capability of providing a redundant power supply for microcontrollers of the management and monitoring unit to be able to perform electric energy storage management and monitoring tasks—in particular for safety relevant electrical consumers. Moreover, information regarding the condition of the energy storage units is reliably provided for the vehicle system. Thus, embodiments provide a high level of security because as long as at least one of the lines in the line arrangement is available, the power supply is ensured. Hence, the disclosed system is able to replace known redundant compressed air-based energy supply. Finally, due to the reliable power supply the system can be in standby modus and can be woken up whenever a signal is present on at least one of the lines of the line arrangement.

Therefore, embodiments of the present invention provide an improved electric power supply for vehicle combinations 10, 20. The unpowered vehicle 20 uses a redundant electric power supply of the powered vehicle, which provides a common or merged supply line 15 for the unpowered vehicle 20 of the vehicle combination. As a result, the combined vehicles are provided with electric supply even if one of the supply circuits (i.e. one of the lines 5) of the powered vehicle 10 is down.

Further embodiments of the present invention related in particular to the following:

A vehicle combination with a powered vehicle 10 having redundant electric power supply system, wherein the coupled, unpowered vehicle 20 (e.g. trailer, etc.) is supplied by electric power even if any of the power supply circuits of the powered vehicle 10 is down.

A vehicle combination with a powered vehicle 10 having redundant electric power supply system 5, wherein the coupled, unpowered vehicle 20 (e.g. trailer, etc.) comprises a common voltage generator unit 1 which is responsible to merge the different power supply lines to provide a common voltage line for the connected vehicle.

The common voltage line generator unit 1 can be realized by protective diodes, which can merge the different power lines 5. The common voltage line generator unit 1 may ensure that the independent power input lines are not connected directly. The independent power input lines 5 may be realized by fuses any her active interruption elements.

The description and drawing merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 1 merging unit
2 splitting unit
3 voltage converter(s)
4 energy management and monitoring unit
5 line arrangement
10 powered vehicle
15 common voltage line
20 unpowered vehicle
21, 22 redundant voltage supply lines

The invention claimed is:

1. A system for providing power to an unpowered vehicle by a powered vehicle, the powered vehicle and the unpowered vehicle forming a vehicle combination, comprising:
a line arrangement with multiple lines representing inputs, each of which comprises at least one power line for supplying power;
a merging unit to combine the power lines of the line arrangement to a total voltage on a common voltage line, and
a splitting unit arrangeable on the unpowered vehicle and configured to split the total voltage on the common voltage line into at least two redundant voltages supplied on two separate voltage lines that are provided for a single management unit,
wherein the single management unit is configured to receive a power supply through either of the two separate voltage lines for safety relevant electrical consumers,
wherein the line arrangement and the merging unit are arranged on the powered vehicle to provide power for the unpowered vehicle,
wherein the common voltage line is adapted to ensure that a non-zero total voltage is supplied as long as at least one power line of the line arrangement provides power,
the common voltage line comprises a first portion adapted to be mounted on the powered vehicle and a second portion adapted to be mounted on the unpowered vehicle, and
the first portion and the second portion are connectable by a plug,
wherein the vehicle combination comprises a tractor as the powered vehicle and a trailer as the unpowered vehicle.

2. The system of claim 1, wherein
the line arrangement comprises at least one fuse or switch to prevent an adverse effect of a possible short on at least one of the multiples lines.

3. The system of claim 2, wherein
the at least one fuse or switch comprises at least one diode for preventing a voltage drop when the short occurs.

4. The system according to claim 1, wherein
the splitting unit comprises at least two voltage converters for providing a voltage conversion of the total voltage on the common voltage line into the at least two redundant voltages supplied on the two separate voltage lines.

5. The system according to claim 4, wherein
the at least two voltage converters include one or more DC/DC converters.

6. The system according to claim 1, wherein
the merging unit and/or the splitting unit are integrated into one or more units.

7. The system according to claim 1, wherein the single management unit is configured to perform electric energy storage management and monitoring tasks for the safety relevant electrical consumers.

8. A vehicle or vehicle combination comprising a system of claim 1.

9. A method for providing power to an unpowered vehicle by a powered vehicle, the powered vehicle and the unpowered vehicle forming a vehicle combination, the method comprising the steps of:
feeding power on a line arrangement with multiple lines representing inputs or outputs into a merging unit, wherein each of the multiple lines comprises at least one power line for supplying power;
merging power on the multiple lines of the line arrangement to a total voltage on a common voltage line;
transmitting the total voltage from the powered vehicle to the unpowered vehicle;
splitting the total voltage into at least two redundant voltages on the unpowered vehicle;
providing the at least two redundant voltages supplied on two separate voltage lines for a single management unit; and
receiving, by the single management unit, a power supply through either of the two separate voltage lines for safety relevant electrical consumers;
wherein the common voltage line ensures that a non-zero total voltage is supplied as long as at least one power line of the line arrangement provides power,
the common voltage line comprises a first portion adapted to be mounted on the powered vehicle and a second portion adapted to be mounted on the unpowered vehicle, and
the first portion and the second portion are connectable by a plug;
wherein the vehicle combination comprises a tractor as the powered vehicle and a trailer as the unpowered vehicle.

* * * * *